United States Patent
Vega et al.

(10) Patent No.: US 10,612,412 B2
(45) Date of Patent: Apr. 7, 2020

(54) SYSTEM AND METHOD FOR CONDITION BASED MONITORING OF A GAS TURBINE FILTER HOUSE

(71) Applicant: General Electric Company, Schenectady, NY (US)

(72) Inventors: Jose L. Vega, Querétaro (MX); Ernesto Heliodoro Escobedo Hernandez, Querétaro (MX); Jose Mendoza, La Canada (MX)

(73) Assignee: General Electric Company, Schenectady, NY (US)

( * ) Notice: Subject to any disclaimer, the term of this patent is extended or adjusted under 35 U.S.C. 154(b) by 506 days.

(21) Appl. No.: 15/136,535

(22) Filed: Apr. 22, 2016

(65) Prior Publication Data

US 2017/0306788 A1    Oct. 26, 2017

(51) Int. Cl.
| | | |
|---|---|---|
| *G01B 5/28* | (2006.01) | |
| *G01B 5/30* | (2006.01) | |
| *F01D 21/00* | (2006.01) | |
| *F02C 7/052* | (2006.01) | |
| *G01M 15/14* | (2006.01) | |

(Continued)

(52) U.S. Cl.
CPC ............ *F01D 21/003* (2013.01); *F02C 7/052* (2013.01); *G01M 15/14* (2013.01); *G01N 15/0806* (2013.01); *B01D 46/0086* (2013.01); *B01D 46/446* (2013.01); *F05B 2220/302* (2013.01); *F05B 2270/3015* (2013.01); *G01N 2015/084* (2013.01)

(58) Field of Classification Search
CPC ...... F01D 21/003; F02C 7/052; G01M 15/14; G01N 15/0806; G01N 2015/084; F05B 2270/3015; B01D 46/0086; B01D 46/446
See application file for complete search history.

(56) References Cited

U.S. PATENT DOCUMENTS

| | | |
|---|---|---|
| 7,244,294 B2 | 7/2007 | Kates |
| 2004/0103654 A1* | 6/2004 | Ohtake .................. F01N 3/023 60/295 |

(Continued)

FOREIGN PATENT DOCUMENTS

| | | |
|---|---|---|
| WO | 2014179170 A2 | 11/2014 |
| WO | 2015094049 A1 | 6/2015 |

OTHER PUBLICATIONS

European Search Report dated Sep. 22, 2017.
Chinese Office Action dated Apr. 16, 2018.

*Primary Examiner* — Toan K Le
(74) *Attorney, Agent, or Firm* — Fletcher Yoder, P.C.

(57) ABSTRACT

In one embodiment, a computing device includes one or more processors configured to execute instructions that cause the one or more processors to acquire pressure data measured by at least one pressure sensor disposed proximate to a filter house in an intake of a gas turbine engine system, derive an airflow or an air mass flow through a duct of the intake using a thermodynamic model of the gas turbine engine system based at least on the pressure data, derive an intake pressure drop in the duct using at least the pressure data, derive a loss parameter of the filter house by combining the air mass or air mass flow, and the intake pressure drop, derive a pressure loss model based on the loss parameter over a period of time, and determine a condition of the filter house based on the pressure loss model.

20 Claims, 3 Drawing Sheets

(51) Int. Cl.
*G01N 15/08* (2006.01)
*B01D 46/44* (2006.01)
*B01D 46/00* (2006.01)

(56) References Cited

U.S. PATENT DOCUMENTS

| | | | |
|---|---|---|---|
| 2008/0022855 A1* | 1/2008 | Clements | B01D 46/0021 95/280 |
| 2008/0264045 A1* | 10/2008 | Hara | F01N 3/0222 60/295 |
| 2010/0229514 A1* | 9/2010 | Ayshford | B01D 46/0005 55/482 |
| 2011/0238331 A1* | 9/2011 | Moore | F02D 41/18 702/47 |
| 2011/0299973 A1* | 12/2011 | Zhang | B01D 46/0023 415/121.2 |
| 2012/0111011 A1* | 5/2012 | Pike | F02C 7/04 60/722 |
| 2013/0276514 A1 | 10/2013 | Claudon | |
| 2014/0257672 A1* | 9/2014 | Surnilla | F02M 25/089 701/103 |
| 2015/0020504 A1 | 1/2015 | Nicole et al. | |
| 2016/0348618 A1* | 12/2016 | Detsch | F02M 35/104 |
| 2017/0138291 A1* | 5/2017 | Tsuda | F02D 41/221 |
| 2017/0252689 A1* | 9/2017 | Joshi | B01D 46/0068 |

* cited by examiner

SYSTEM AND METHOD FOR CONDITION BASED MONITORING OF A GAS TURBINE FILTER HOUSE

BACKGROUND

This disclosure relates to gas turbine engine systems and, more particularly, relates to a system and method for condition based monitoring of a filter house included in gas turbine engine systems.

Gas turbine engine systems typically include a compressor for compressing a working fluid, such as air. The compressed air is injected into a combustor which combusts the fluid causing it to expand, and the expanded fluid is forced through a turbine. As the compressor consumes large quantities of air, small quantities of dust, aerosols and water pass through and deposit on the compressor (e.g., deposit onto blades of the compressor). These deposits impede airflow through the compressor and degrade overall performance of the gas turbine engine over time. Therefore, a filter house in an intake may include one or more filters used to filter or otherwise block the particles from entering the gas turbine engine. However, over time the filters accumulate particles (e.g., become dirty) and may cause a drop in air pressure and air flow in the intake that affects the efficiency of the gas turbine engine. In some instances, schedule based monitoring may be used to change the filters in the filter house, for example, after a certain amount of engine operating hours. As may be appreciated, some environments (e.g., close to seashore) may contain higher levels of particles that accelerate the dirtiness of the filters. Dirtier filters may cause the gas turbine engine to operate inefficiently until the scheduled replacement date. In another example, some environments may contain lower levels of particles that decelerate the dirtiness level of the filters, which may lead to a clean filter being changed too early.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a computing device includes one or more processors configured to execute instructions that cause the one or more processors to acquire pressure data measured by at least one pressure sensor disposed proximate to a filter house in an intake of a gas turbine engine system, derive an airflow or an air mass flow through a duct of the intake using a thermodynamic model of the gas turbine engine system based at least on the pressure data, derive an intake pressure drop in the duct using at least the pressure data, derive a loss parameter of the filter house by combining the air mass or air mass flow, and the intake pressure drop, derive a pressure loss model based on the loss parameter over a period of time, and determine a condition of the filter house based on the pressure loss model.

In one embodiment, a method includes acquiring, via a processor, pressure data measured by at least one pressure sensor disposed proximate to a filter house in an intake of a gas turbine engine system, deriving, via the processor, an air mass or an air mass flow through a duct of the intake using a thermodynamic model of the gas turbine engine system based at least on the pressure data, deriving, via the processor, an intake pressure drop in the duct using at least the pressure data, deriving, via the processor, a loss parameter of the filter house by combining the air mass or air mass flow, and the intake pressure drop, deriving, via the processor, a pressure loss model based on the loss parameter over a period of time, and determining, via the processor, a condition of the filter house based on the pressure loss model.

In one embodiment, a tangible, non-transitory computer readable medium storing computer instructions that, when executed by one or more processors, causes the one or more processors to acquire pressure data measured by at least one pressure sensor disposed behind a filter house in an intake of a gas turbine engine system, derive an air mass or an air mass flow through a duct of the intake using a thermodynamic model of the gas turbine engine system based at least on the pressure data, derive an intake pressure drop in the duct using at least the pressure data, derive a loss parameter of the filter house by combining the air mass or air mass flow, and the intake pressure drop, derive a pressure loss model based on the loss parameter over a period of time, and determine a condition of the filter house based on the pressure loss model.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Degraded filters may reduce the efficiency of a gas turbine engine system by reducing the amount of air pressure in the system, and/or the amount or air flow. The filters may become degraded (e.g., dirty) through the deposition of certain particles (e.g., dust, salt, dirt). The disclosed embodiments are directed to condition based monitoring of a filter house included in a gas turbine engine system to determine when to replace filters in the filter house that are degraded below a threshold. In some embodiments, degradation of the filter house may be detected using one or more models and data from at least one pressure sensor. For example, a single pressure sensor measurement stored in a database may be linked with a thermodynamic model of the gas turbine engine system to estimate the filter house efficiency and trend the degradation of the filter house using a pressure loss model. A replacement time for the filter house that is more optimal in some sense may be output to the customer. For example, the replacement time may be longer than a scheduled replacement time, thus providing for longer equipment life and use. Further, the cost of the lost power output from the gas turbine engine system due to the degraded filter house may be estimated and output to the customer. Using the one or more models, fleet level information related to conditions of the filter houses in the gas turbine engine systems across a fleet of turbine engine systems may be obtained and analyzed to make replacement decisions and to visualize the engineering and/or financial impact of lost power output across the fleet.

Figure 1:
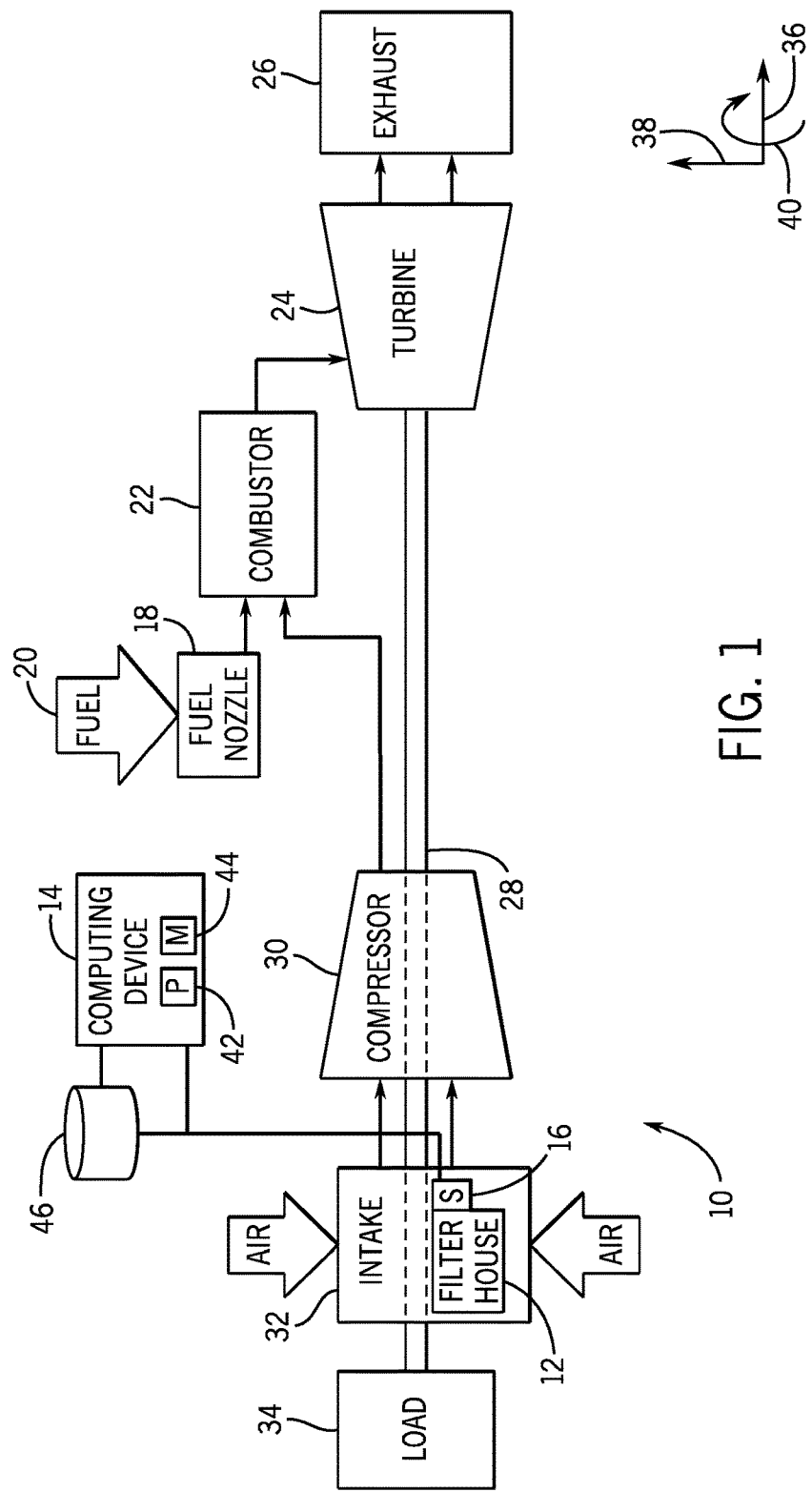
FIG. 1 is a block diagram of a gas turbine engine system including a filter house, in accordance with an embodiment.

FIG. 1 is a block diagram of a gas turbine engine system 10 including a filter house 12, in accordance with an embodiment. As described in detail below, in some embodiments, the disclosed gas turbine engine system 10 (e.g., an aeroderivative gas turbine engine) may include a computing device 14 programmed to perform condition based monitoring of the filter house 12 using data from one or more sensors 16. The computing device 14 may be a controller, such as a gas turbine controller, included in the gas turbine engine system 10, a computer (e.g., in a workstation in communication with the sensors 16), a server, a tablet, a smartphone, a laptop, or the like. In embodiments where the computing device 14, is a gas turbine controller, the gas turbine controller may be operatively coupled to various components or systems included in the gas turbine engine system 10 to control the various component or systems during operations. The computing device 14 may determine a desirable time period to replace the filter house 12 to maintain engine efficiency based on a detected level of degradation of the filter house 12. The gas turbine engine system 10 may use liquid or gas fuel, such as natural gas and/or a hydrogen rich synthetic gas, to drive the gas turbine engine system 10. As depicted, fuel nozzles 18 (e.g., multi-tube fuel nozzles) intake a fuel supply 20, mix the fuel with an oxidant, such as air, oxygen, oxygen-enriched air, oxygen reduced air, or any combination thereof. Although the following discussion refers to the oxidant as the air, any suitable oxidant may be used with the disclosed embodiments. Once the fuel and air have been mixed, the fuel nozzles 18 distribute the fuel-air mixture into a combustor 22 in a suitable ratio for optimal combustion, emissions, fuel consumption, and power output. The gas turbine engine system 10 may include one or more fuel nozzles 18 located inside one or more combustors 22. The fuel-air mixture combusts in a chamber within the combustor 22, thereby creating hot pressurized exhaust gases. The combustor 22 directs the exhaust gases through a turbine 24 toward an exhaust outlet 26. As the exhaust gases pass through the turbine 24, the gases force turbine blades to rotate a shaft 28 along an axis of the turbine system 10.

As illustrated, the shaft 28 may be connected to various components of the turbine system 10, including a compressor 30. The compressor 30 also includes blades coupled to the shaft 28. As the shaft 28 rotates, the blades within the compressor 30 also rotate, thereby compressing air from an air intake 32 through the compressor 30 and into the fuel nozzles 18 and/or combustor 22. The intake 32 may also be referred to as an "inlet" herein and may include the filter house 12. The shaft 28 may also be connected to a load 34, which may be a vehicle or a stationary load, such as an electrical generator in a power plant or a propeller on an aircraft, for example. The load 34 may include any suitable device capable of being powered by the rotational output of the gas turbine engine system 10. The gas turbine engine system 10 may extend along an axial axis or direction 36, a radial axis or direction 38 toward or away from the axis 36, and a circumferential axis or direction 40 around the axis 36.

The computing device 14 may include a physical processor 42 or multiple physical processors and a memory 44 or multiple memories. The processor 42 may be coupled to the memory 44 to execute instructions for carrying out the presently disclosed techniques. These instructions may be encoded in programs or code stored in a tangible non-transitory computer-readable medium, such as the memory 44 and/or other storage. The processor 42 may be a general purpose processor, system-on-chip (SoC) device, or application-specific integrated circuit, or some other processor configuration. For example, the processor 42 may be part of an engine control unit that controls various aspects of the gas turbine engine system 10. The computing device 14 may be coupled to the one or more sensors 16, the fuel nozzle 18, the combustor 22, the turbine 24, and/or the compressor 30, among other things.

The memory 44 may include a computer readable medium, such as, without limitation, a hard disk drive, a solid state drive, a diskette, a flash drive, a compact disc, a digital video disc, random access memory (RAM), and/or any suitable storage device that enables processor 42 to store, retrieve, and/or execute instructions and/or data. The memory 44 may further include one or more local and/or remote storage devices. The memory 44 may store historical data related to the gas turbine engine system 10, such as one or more derived pressure loss parameters over time, to be used in individual filter house 12 degradation analysis and/or fleet level filter house 12 degradation analysis. Further, the computing device 14 may be operatively connected to a human machine interface (HMI) to allow an operator to read measurements, perform analysis, and/or adjust set points of operation.

Further, the gas turbine engine system 10 may include a database 46 that stores data obtained by the one or more pressure sensors 16. For example, the pressure data may include a pressure measurement obtained downstream or behind the filter house 16 within a duct and timestamps corresponding to times that the pressure measurement is obtained. The pressure measurements may be obtained during startup, shutdown, at baseload, and/or any other operation of the gas turbine engine system 10. In this way, the database 46 may retain historical data related to the pressures to enable the processor 42 to determine when the filter house 12 is degraded based on a trend of the pressures, as described in more detail below. As such, the processor 42 may be communicatively coupled to the database 46. In some embodiments, the database 46 may be located on a dedicated server, while in other embodiments, the database 46 may be located in the memory 44 as part of the computing device 14.

Figure 2:
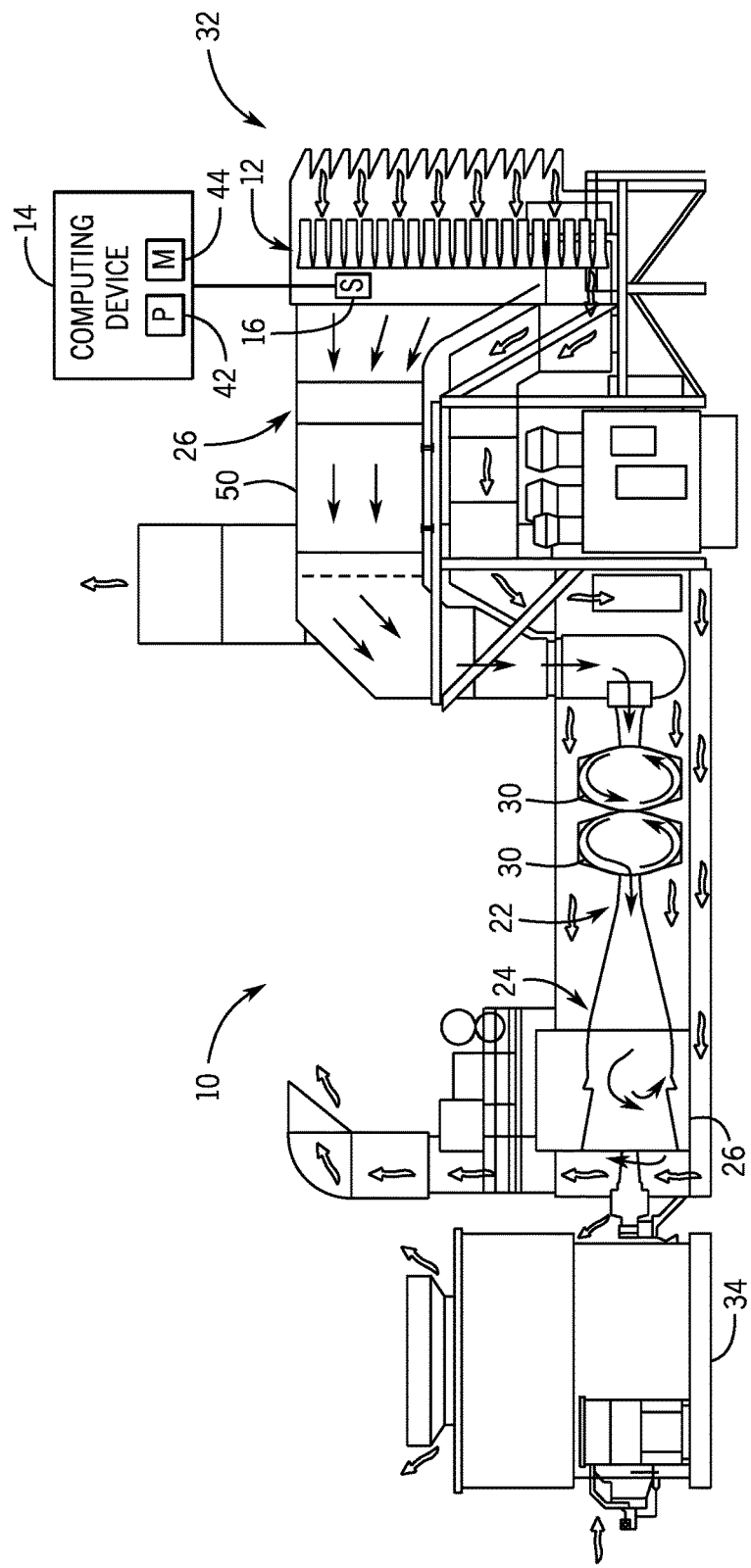
FIG. 2 is a schematic illustration of the gas turbine engine system including the filter house shown in FIG. 1, in accordance with an embodiment.

FIG. 2 is a schematic illustration of the gas turbine engine system 10 including the filter house 12 shown in FIG. 1, in accordance with an embodiment. As illustrated, the gas turbine engine system 10 is a stationary aeroderivative gas turbine engine attached to a generator (e.g., load 34) that is suitable for producing electrical power. Air may enter the gas turbine engine system 10 via the intake 32. The filter house 12 may include one or more filters that are used to sift out particles in the incoming air stream so that clean air enters the compressor 30, among other components. As the gas turbine engine system 10 operates, the filter house 12 may become dirty by accumulating particles (e.g., dust, salt, dirt) causing less air to flow into the gas turbine engine system 10. As a result, the gas turbine engine system 10 produces less power output (e.g., approximately 0.01 to 3 megawatts, 0.1 to 0.5 megawatts). The accumulative cost and/or megawatt total of the power lost across all gas turbine engine systems 10 in a fleet may be significant.

Thus, the computing device 14 may be used to monitor the efficiency of the filter house 12 by tracking pressure loss data obtained by the pressure sensor 16 in the gas turbine engine system 10. In some embodiments, the computing device 14 may provide an advisory report of a desirable time period to replace the filter house 12 when it determines that the filter house 12 is degraded. Using condition based monitoring may enable obtaining the useful life out of the filter house 12 by replacing the filter house 12 when it becomes degraded (which may be sooner or later depending on the environment). In contrast, replacing the filter house 12 based on a regular schedule may result in losing useful life of the filter house 12 by replacing the filter house 12 before it becomes dirty or losing power output by waiting to replace the filter house 12 for a time period while the filter house 12 is degraded.

As illustrated, the filter house 12 may be located in a duct 50 proximate to entry vents or openings in the intake 32. As depicted, in some embodiments, a single pressure sensor 16 may be located proximate to a backside or downstream of the filter house 12 in the duct 50. However, it should be understood that the single pressure sensor 16 may be located within a portion of the filter house 12 (e.g., in between two filters), any suitable location within the duct 50 behind or downstream the filter house 12, or in front or upstream of the filter house 12. The placement of the pressure sensor 16 may determine what type of pressure loss is captured (e.g., the pressure loss upstream of the pressure sensor 16 may be captured). Further, in some embodiments, more than one pressure sensor 16 may be used to perform the techniques described herein. For example, a first pressure sensor 16 may be located behind the filter house 12 and a second pressure sensor 16 may be located in front of the filter house 12.

In general, the techniques for detecting degradation of the filter house 12 using a single pressure sensor 16 after the filter house 12 may be described as follows. In some embodiments, the single pressure sensor 16 behind the filter house 12 may first measure the pressure of ambient air when there is no air flowing into the filter house 12. When the gas turbine engine system 10 is started, air begins to flow into the intake 32 and there is a difference in the air pressure that may be sensed. The inlet pressure drop may vary as the gas turbine engine system 10 operates over time. The computing device 14 may take account of pressure loss over time to derive a pressure loss model. The pressure drop may vary based on the amount of load 34 being driven by the gas turbine engine system 10. For example, higher masses of air going into the gas turbine engine system 10 may result in higher pressure drops. As a result, the pressure loss may be a function of how much load is driven by the gas turbine engine system 10. Thus, the computing device 14 may use the pressure loss model to track (e.g., via the single sensor 16 and load sensors) the various loads and pressure losses and determine when the pressure loss deviates from a trend by more than a threshold amount.

In addition, a physics-based model, such as a thermodynamic model, may be used that uses as input data from other sensors (e.g., fuel usage, air flow, temperature, pressure, knock, and/or vibration, etc.) in the gas turbine engine system 10 disposed at other locations, such as on the compressor 30, the fuel nozzle 18, the combustor 22, the turbine 24, the shaft 28, the exhaust 26, and/or the load 34. The thermodynamic model may be used to make an estimation of the performance (e.g., speed, fuel usage, temperature, pressure) of the gas turbine engine system 10. With the performance of the gas turbine engine system 10 thus derived, the computing device 14 may calculate an estimated air flow or mass in the gas turbine engine system 10 that was used to arrive at the estimated gas turbine engine system 10 performance. The computing device 14 may then combine the estimated air flow or mass with the sensed pressure drop to calculate the loss parameter due to the filter house 12 degradation. The loss parameter may be tracked (e.g., followed over a desired time period) to develop the pressure loss model so the loss parameter for approximately the same mass or flow of air may be compared to determine the filter house 12 degradation. Additional details related to the degradation detection and advisory techniques are discussed with regards to the flow chart below.

Figure 3:
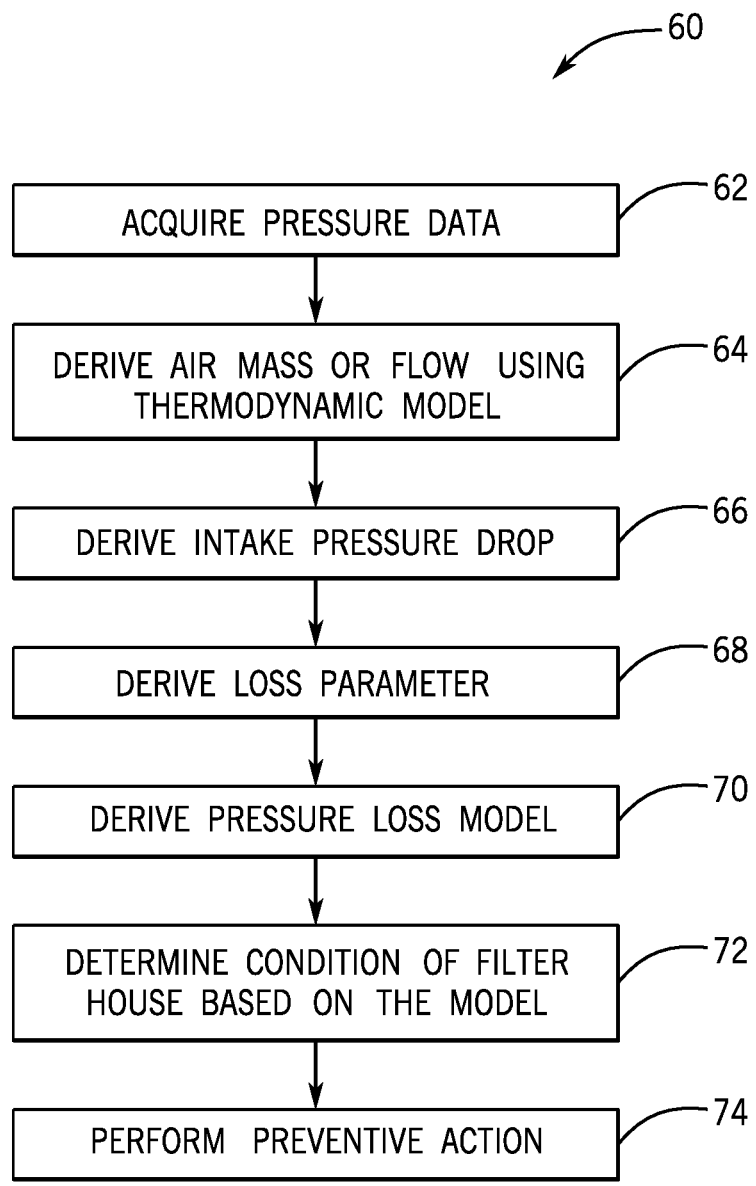
FIG. 3 is a flow chart illustrating a method for condition based monitoring of the filter house included in the gas turbine engine system shown in FIG. 1, in accordance with an embodiment.

FIG. 3 is a flow chart illustrating a process 60 suitable for automating condition based monitoring of the filter house 12 included in the gas turbine engine system 10 shown in FIG. 1, in accordance with an embodiment. The process 60 may be implemented as computer instructions or code executable via the processor 42 and stored in the memory 44. Although the following description of the process 60 is described with reference to the processor 42 of the computing device 14, it should be noted that the process 60 may be performed by other processors disposed on other devices that may be capable of communicating with the computing device 14, the sensor 16, and/or the database 46, such as a cloud-based computing system or other computing components associated with the gas turbine engine system 10. Additionally, although the following process 60 describes a number of operations that may be performed, it should be noted that the process 60 may be performed in a variety of suitable orders and all of the operations may not be performed. It should be appreciated that the process 60 may be wholly executed by the computing device 14 or the execution may be distributed between the computing device 4, the cloud-based computing system, and/or other computing components associated with the gas turbine engine system 10.

Referring now to the process 60, the processor 42 may acquire pressure data (block 62) from the one or more pressure sensors 16, the database 46, and/or the memory 44. As previously discussed, pressure data may be obtained from the single pressure sensor 16 located proximately after or downstream of the filter house 12. The pressure data may be measured during engine startup, base load operation, and/or shutdown. Further, the performance of the engine may be determined by the processor 42 deriving air mass or flow using a thermodynamic model (block 64). The thermodynamic model may be implemented as a multi-variable non-linear or linear function that estimates performance of the gas turbine engine system 10 based on the operating condition of the gas turbine engine system 10. Accordingly, an engine cycle deck that may include timing information and parameters associated with different cycles (e.g., startup, intake, combustion, power, exhaust, shutdown, etc.) of the gas turbine engine system 10 may be included and used in conjunction with measurements from sensors as the operating conditions in the thermodynamic model. Using the thermodynamic model, the processor 42 may derive how much air mass or flow is traversing through the duct 50 according to the operating conditions of the gas turbine engine system 10.

The processor 42 may also derive the pressure drop in the intake 32 (block 66). As previously discussed, in some embodiments, only pressure data from a single pressure sensor 16 behind or downstream from the filter house 12 may be used by the processor 42 to derive the pressure drop in an area starting from in front of the filter house 12 ending behind the filter house 12 when the gas turbine engine system 10 is powered on or is shutting down. In some embodiments, the processor 42 may determine the power impact (e.g., impact of production of power) of the pressure loss caused by the filter house 12. To determine the power impact of the pressure loss caused by the filter house 12, the processor 42 may obtain a specific power rating (e.g., approximately $70 per megawatt-hour) and the operational hours of the gas turbine engine system 10. Then, the processor 42 may calculate the amount of money lost due to the degraded filter house 12 by multiplying the power output loss that results from the pressure drop by the power rating and the operational hours. It should be appreciated that numerous gas turbine engine systems 10 in a fleet may be monitored by the computing device 14 or a cloud based computing system, and the power impact may be determined at the fleet level by multiplying the averaged power output loss by the averaged power rating of the gas turbine engine systems 10 and the averaged operational hours of the gas turbine engine systems 10. The power impact may be visualized on the computing device 14 by being displayed on a display of the device 14.

The processor 42 may combine the pressure drop with the air mass or flow to derive the loss parameter (block 68). Numerous loss parameters may be obtained for various air masses or flows over time. It should be appreciated that the various air masses or flows are derived by the processor 42 accounting for the operating conditions of the gas turbine engine system 10, as discussed above. The loss parameters may include static pressure (e.g., pressure at a point of a fluid) or dynamic pressure (e.g., kinetic energy of per unit volume of a fluid particle) losses. Larger air masses or flows may be associated with larger pressure loss. However, for the same approximate air mass or flow, the loss parameter should be approximately the same if the filter house 12 is not degraded. The processor 42 may track the loss parameters by storing the loss parameters in the database 46 and/or the memory 44. The processor 42 may derive a pressure loss model (block 70) based on historical loss parameter data with respect to time. The pressure loss model may provide a trend of loss parameters over time for various air masses and flows. The processor 42 may use the pressure loss model to derive how the duct 50 behaves (e.g., how much pressure is lost) with respect to air flow going through the duct 50. The pressure loss model may include a multi-variable non-linear or linear function.

Accordingly, the processor 42 may determine a condition of the filter house 12 based on the pressure loss model (block 72). For example, when a subsequently derived loss parameter differs from the loss parameter (e.g., greater pressure drop) according to the pressure loss model for a similar air mass or flow by more than a threshold amount (e.g., percentage amount), then the processor 42 may determine that the filter house 12 is degraded. The processor 42 may perform a preventative action (block 74). The preventative action may include displaying an advisory on the computing device 14 that the gas turbine engine system 10 is not operating efficiently due to a decrease in air pressure caused by a degraded filter house 12. Further, the preventative action may include providing a near optimal time to change the filter house 12 based on certain factors, such as scheduled maintenance, severity of degradation, and the like. Also, the preventative action may include automatically scheduling replacement of the filter house 12. In some embodiments, the advisory may include a recommendation of a replacement time for the filter house 12 that costs less money than continuing operation of the gas turbine engine system 10 with the degraded filter house 12. That is, the processor 42 may calculate the cost of the power loss due to the degraded filter house 12 and compare the power loss cost to the cost of replacing the filter house 12. The cost of replacing the filter house 12 may include the cost of labor, parts, and/or gas turbine engine system downtime (e.g., power output lost while the system 10 is not operational). The cost of the labor and the parts may be obtained from the database 46, the memory 44, a remote server, the Internet, or the like. When the cost of replacing the filter house 12 is less than the cost of continuing to operate the gas turbine engine system 10 inefficiently with the degraded filter house 12, the processor 42 may output the advisory to replace the degraded filter house 12 with a recommended replacement timeframe.

Also, if the loss parameter indicates that the pressure in the gas turbine engine system 10 has dropped to a level that causes significant operating inefficiency, the processor 42 may recommend that the gas turbine engine system 10 be shut down as soon as possible. In some embodiments, the processor 42 may shut down the gas turbine engine system 10 when the degradation has reached severe degradation. In another example, the processor 42 may recommend that the filter house 12 be replaced at the next scheduled maintenance so as to not interrupt normal operating hours when the degradation is minor or has just been detected and the next scheduled maintenance is relatively soon. As may be appreciated, if the trend of the loss parameter continues to worsen at a quick pace (as determined using the pressure loss model), the processor 42 may perform a preventative action that is proportional to the severity level of degradation, such as recommending replacing the filter house 12 as soon as possible, shutting down the gas turbine engine system 10, or the like.

The above description of the process 60 is primarily described as being performed at the individual gas turbine engine system 10 level. However, it should be appreciated that the process 60 may be performed by the processor 42 at the fleet level for all of the gas turbine engine systems 10 included in the fleet. For example, the processor 42 may acquire pressure sensor data (block 62) for each of the gas turbine engine systems 10 from the database 46 and/or the memory 44. The processor 42 may derive the air mass and flow for each of the gas turbine engine systems 10 based on the performance of the system 10 according to the thermodynamic model for each gas turbine engine system 10 (block 64). The processor 42 may also derive the intake pressure drop for each of the gas turbine engine systems 10 in the fleet based on respective pressure data from the sensor 16 behind each of the filter houses 12 (block 66). The processor 42 may derive the loss parameter for each of the gas turbine engine systems 10 by combining the air mass or flow with the intake pressure drop (block 68). Further, the processor 42 may average the loss parameters to derive a fleet baseline pressure loss model (block 70). The computing device 14 may compare any subsequent loss parameters derived for each of the individual gas turbine engine systems 10 to the fleet baseline pressure loss model to determine the condition of the filter house 12 of each of the gas turbine engine systems 10 in the fleet (block 72). When the individual loss parameter for a respective gas turbine engine system 10 differs from the fleet baseline pressure loss model for a similar air mass or flow by a threshold amount, the processor 42 may determine that the filter house 12 is degraded and perform a preventative action (block 74).

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A computing device, comprising:
one or more processors configured to execute instructions that cause the one or more processors to:
  acquire pressure data measured by at least one pressure sensor disposed proximate to a filter house in an intake of a gas turbine engine system;
  derive an airflow or an air mass flow through a duct of the intake using a thermodynamic model of the gas turbine engine system based at least on the pressure data, wherein the thermodynamic model comprises a physics-based model of the gas turbine engine configured to estimate the airflow or the air mass based on at least the pressure data;
  derive an intake pressure drop in the duct using at least the pressure data;
  derive a loss parameter of the filter house by combining the air mass or air mass flow, and the intake pressure drop;
  derive a pressure loss model based on the loss parameter over a period of time; and
  determine a condition of the filter house based on the pressure loss model.

2. The computing device of claim 1, wherein the one or more processors are configured to execute the instructions that cause the one or more processors to determine the filter house is degraded when a subsequently derived loss parameter differs from the pressure loss model by a threshold.

3. The computing device of claim 1, wherein the one or more processors are configured to execute the instructions that cause the one or more processors to perform a preventative action when the condition of the filter house comprises degradation.

4. The computing device of claim 3, wherein the preventative action comprises outputting an advisory including a recommendation to replace the filter house when the cost of replacing the filter house is less than the cost associated with power output lost by continuing operating the gas turbine engine system.

5. The computing device of claim 3, wherein the preventative action comprises outputting an advisory, shutting down the gas turbine engine system, automatically scheduling replacement of the filter house, or some combination thereof.

6. The computing device of claim 1, wherein the pressure data is obtained by the at least one pressure sensor during startup, base load operation, shutdown, or some combination thereof, of the gas turbine engine system.

7. The computing device of claim 1, wherein the at least one pressure sensor comprises a single pressure sensor.

8. The computing device of claim 1, wherein the at least one pressure sensor is located directly behind the filter house.

9. The computing device of claim 1, wherein the one or more processors are configured to execute the instructions that cause the one or more processors to determine an engineering impact, a financial impact, or a combination thereof, of power output lost due to operating the gas turbine engine system with the filter house in the condition.

10. The computing device of claim 1, wherein the one or more processors are configured to execute the instructions that cause the one or more processors to:
  derive a plurality of loss parameters of a plurality of filter houses included in a plurality of gas turbine engine systems in a fleet;
  average the plurality of loss parameters over time; and
  derive a fleet baseline pressure loss model based at least on the averaged plurality of loss parameters over time.

11. The computing device of claim 10, wherein the one or more processors are configured to execute the instructions that cause the one or more processors to:
  determine the condition of the filter house by comparing a subsequently derived loss parameter for the filter house of the gas turbine engine system to the fleet baseline pressure loss model; and
  perform a preventative action when the condition comprises degradation.

12. A method, comprising:
acquiring, via a processor, pressure data measured by at least one pressure sensor disposed proximate to a filter house in an intake of a gas turbine engine system;
deriving, via the processor, an air mass or an air mass flow through a duct of the intake using a thermodynamic model of the gas turbine engine system based at least on the pressure data, wherein the thermodynamic model comprises a physics-based model of the gas turbine engine configured to estimate the airflow or the air mass based on at least the pressure data;
deriving, via the processor, an intake pressure drop in the duct using at least the pressure data;
deriving, via the processor, a loss parameter of the filter house by combining the air mass or air mass flow, and the intake pressure drop;
deriving, via the processor, a pressure loss model based on the loss parameter over a period of time; and
determining, via the processor, a condition of the filter house based on the pressure loss model.

13. The method of claim 12, wherein determining the condition of the filter house based on the pressure loss model comprises determining that the filter house is degraded when a subsequently derived loss parameter differs from the pressure loss model by a threshold.

14. The method of claim 12, comprising performing a preventative action when the condition comprises degradation, wherein the preventative action comprises shutting down the gas turbine engine system, outputting an advisory to replace the filter house, scheduling replacement of the filter house, or some combination thereof.

15. The method of claim 12, comprising:
deriving a plurality of loss parameters of a plurality of filter houses included in a plurality of gas turbine engine systems in a fleet;
averaging the plurality of loss parameters over time; and
deriving a fleet baseline pressure loss model based at least on the averaged plurality of loss parameters over time.

16. The method of claim 15, comprising:
determining the condition of the filter house by comparing a subsequently derived loss parameter for the filter house of the gas turbine engine system to the fleet baseline pressure loss model; and
performing a preventative action when the condition comprises degradation.

17. The method of claim 12, wherein acquiring the pressure data comprises acquiring the pressure data from a database stored on a remote server or stored in a memory located in a same computing device as the processor.

18. A tangible, non-transitory computer readable medium storing computer instructions that, when executed by one or more processors, cause the one or more processors to:
acquire pressure data measured by at least one pressure sensor disposed behind a filter house in an intake of a gas turbine engine system;
derive an air mass or an air mass flow through a duct of the intake using a thermodynamic model of the gas turbine engine system based at least on the pressure data, wherein the thermodynamic model comprises a physics-based model of the gas turbine engine configured to estimate the airflow or the air mass based on at least the pressure data;
derive an intake pressure drop in the duct using at least the pressure data;
derive a loss parameter of the filter house by combining the air mass or air mass flow, and the intake pressure drop;
derive a pressure loss model based on the loss parameter over a period of time; and
determine a condition of the filter house based on the pressure loss model.

19. The computer readable medium of claim 18, wherein the computer instructions, when executed by the one or more processors, cause the one or more processors to derive the air mass or air mass flow using the thermodynamic model to derive performance of the gas turbine engine system.

20. The computer readable medium of claim 18, wherein the computer instructions, when executed by the one or more processors, cause the one or more processors to perform a preventative action when the condition comprises degradation, wherein the preventative action comprises:
shutting down the gas turbine engine system;
scheduling replacement of the filter house;
outputting an advisory when replacing the filter house costs less than continuing operation of the gas turbine engine system with the filter house in the condition; or
some combination thereof.

* * * * *